United States Patent
Ismael et al.

(10) Patent No.: US 9,912,681 B1
(45) Date of Patent: Mar. 6, 2018

(54) INJECTION OF CONTENT PROCESSING DELAY IN AN ENDPOINT

(71) Applicant: FireEye, Inc., Milpitas, CA (US)

(72) Inventors: Osman Abdoul Ismael, Palo Alto, CA (US); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 83 days.

(21) Appl. No.: 14/929,693

(22) Filed: Nov. 2, 2015

Related U.S. Application Data

(60) Provisional application No. 62/140,993, filed on Mar. 31, 2015.

(51) Int. Cl.
H04L 29/06 (2006.01)

(52) U.S. Cl.
CPC .............................. *H04L 63/1425* (2013.01)

(58) Field of Classification Search
CPC ............. H04L 63/1425; H04L 63/1416; H04L 63/145; G06F 21/564; G06F 21/565; G06F 21/566
USPC ...................... 726/22–24; 713/188
See application file for complete search history.

(56) References Cited

U.S. PATENT DOCUMENTS

| | | | |
|---|---|---|---|
| 8,196,205 B2 * | 6/2012 | Gribble ................... | G06F 21/53 713/168 |
| 8,201,246 B1 | 6/2012 | Wu et al. | |
| 8,271,978 B2 | 9/2012 | Bennett et al. | |
| 8,375,369 B2 | 2/2013 | Mensch et al. | |
| 8,479,286 B2 | 7/2013 | Dalcher et al. | |
| 8,479,292 B1 | 7/2013 | Li et al. | |
| 8,612,995 B1 | 12/2013 | Yun | |
| 8,621,610 B2 * | 12/2013 | Oberheide ............ | G06F 21/562 713/189 |
| 8,695,060 B2 | 4/2014 | Wade et al. | |

(Continued)

FOREIGN PATENT DOCUMENTS

| WO | WO 2012/135192 | 10/2012 |
|---|---|---|
| WO | WO 2012/154664 | 11/2012 |

(Continued)

OTHER PUBLICATIONS

Tanenbaum, Andrew S., "Computer Networks. 3rd." Edition (1996), pp. 521-542.

(Continued)

*Primary Examiner* — Hosuk Song
(74) *Attorney, Agent, or Firm* — Cesari and McKenna, LLP

(57) ABSTRACT

A malware detection system (MDS) appliance is configured to inject delay associated with delivery and/or processing of communication traffic directed to one or more endpoints in a network. The appliance may be positioned within the network to intercept and analyze (e.g., replay and instrument) one or more network packets of the communication traffic to detect whether an object of the packet contains malware. However, such analysis, e.g., malware detection analysis, may require extensive processing at the appliance and, thus, consume a considerable amount of time. Accordingly, the MDS appliance may inject delay into the delivery and/or processing of the object on the endpoint until the malware detection analysis completes and the malware is validated.

25 Claims, 8 Drawing Sheets

(56) References Cited

U.S. PATENT DOCUMENTS

| | | | |
|---|---|---|---|
| 8,775,715 B2 | 7/2014 | Tsirkin et al. | |
| 8,832,352 B2 | 9/2014 | Tsirkin et al. | |
| 8,839,245 B1 | 9/2014 | Khajuria et al. | |
| 9,043,913 B2* | 5/2015 | Gribble | G06F 21/53 726/24 |
| 9,043,923 B2* | 5/2015 | Kruglick | G06F 21/55 726/22 |
| 9,356,945 B2* | 5/2016 | Gafni | H04L 63/1425 |
| 9,413,774 B1* | 8/2016 | Liu | H04L 63/1416 |
| 9,432,389 B1* | 8/2016 | Khalid | H04L 63/1425 |
| 2003/0120856 A1 | 6/2003 | Neiger et al. | |
| 2005/0216759 A1 | 9/2005 | Rothman et al. | |
| 2008/0028124 A1 | 1/2008 | Tago | |
| 2008/0244206 A1 | 10/2008 | Heo et al. | |
| 2010/0023810 A1 | 1/2010 | Stolfo et al. | |
| 2011/0004935 A1 | 1/2011 | Moffie et al. | |
| 2011/0047542 A1 | 2/2011 | Dang et al. | |
| 2011/0153909 A1 | 6/2011 | Dong | |
| 2011/0296412 A1 | 12/2011 | Banga et al. | |
| 2011/0314546 A1 | 12/2011 | Aziz et al. | |
| 2012/0047580 A1 | 2/2012 | Smith et al. | |
| 2012/0233612 A1 | 9/2012 | Beckett | |
| 2012/0254995 A1 | 10/2012 | Sallam | |
| 2012/0255002 A1 | 10/2012 | Sallam | |
| 2012/0255016 A1 | 10/2012 | Sallam | |
| 2012/0255017 A1 | 10/2012 | Sallam | |
| 2012/0255021 A1 | 10/2012 | Sallam | |
| 2012/0311708 A1 | 12/2012 | Agarwal et al. | |
| 2013/0031374 A1 | 1/2013 | Thom et al. | |
| 2013/0055256 A1 | 2/2013 | Banga et al. | |
| 2013/0061012 A1 | 3/2013 | Turner et al. | |
| 2013/0145471 A1 | 6/2013 | Richard et al. | |
| 2013/0191924 A1 | 6/2013 | Tedesco et al. | |
| 2013/0333033 A1 | 12/2013 | Khesin | |
| 2013/0346966 A1 | 12/2013 | Natu et al. | |

FOREIGN PATENT DOCUMENTS

| | | |
|---|---|---|
| WO | WO-2012/177464 A1 | 12/2012 |
| WO | WO-2014/004747 A2 | 1/2014 |
| WO | WO-2013/091221 A1 | 6/2015 |

OTHER PUBLICATIONS

Amiri Sam, Ardalan, et al. "I/O paravirtualization at the device file boundary," *ACM SIGPLAN Notices* 49.4 (2014), pp. 319-332.

"Bromium vSentry—Defeat the Unknown Attack," Oct. 10, 2013, 11 pages.

Bromium Corp, "Live Attack Visualization and Analysis, What does a Malware attack look like?" http://www.bromium.com/sites/default/files/Bromium%20LAVA%20WP_2.pdf on Dec. 1, 2013, 11 pages.

Chen, Peter M., and Brian D. Noble. "When virtual is better than real [operating system relocation to virtual machines]." Hot Topics in Operating Systems, 2001. Proceedings of the Eighth Workshop on. IEEE, 2001.

Gao, Debin, Michael K. Reiter, and Dawn Xiaodong Song. "On Gray-Box Program Tracking for Anomaly Detection." USENIX security symposium. 2004.

Garfinkel, Tal, and Mendel Rosenblum. "A Virtual Machine Introspection Based Architecture for Intrusion Detection." NDSS. 2003.

Heiser, Gernot, and Ben Leslie. "The OKL4 Microvisor: Convergence point of microkernels and hypervisors." Proceedings of the first ACM asia-pacific workshop on Workshop on systems. ACM, 2010.

Hofmeyr, Steven A., Stephanie Forrest, and Anil Somayaji. "Intrusion detection using sequences of system calls." Journal of computer security 6.3 (1998): 151-180.

Huang, Yih, et al. "Efficiently tracking application interactions using lightweight virtualization." Proceedings of the 1st ACM workshop on Virtual machine security. ACM, 2008.

Iqbal, Asif, Nayeema Sadeque, and Rafika Ida Mutia. "An overview of microkernel, hypervisor and microvisor virtualization approaches for embedded systems." *Report, Department of Electrical and Information Technology, Lund University*, Sweden 2110 (2009), 15 Pages.

Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.

Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.

Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.

Kapravelos, Alexandros, et al. "Revolver: An Automated Approach to the Detection of Evasive Web-based Malware." USENIX Security Symposium. 2013.

King, Samuel T., and Peter M. Chen, "SubVirt: Implementing malware with virtual machines." *Security and Privacy, 2006 IEEE Symposium on*. IEEE, 2006, 14 Pages.

Kosoresow, Andrew P., and Steven A. Hofmeyr. "Intrusion detection via system call traces." IEEE software 14.5 (1997): 35-42.

Laureano, Marcos, Carlos Maziero, and Edgard Jamhour. "Intrusion detection in virtual machine environments." Euromicro Conference, 2004. Proceedings. 30th. IEEE, 2004.

Levin, Thomas E., Cynthia E. Irvine, and Thuy D. Nguyen. Least privilege in separation kernels. Naval Postgraduate School Monterey CA Dept of Computer Science, 2006.

Nguyen, Anh M., et al. "Mavmm: Lightweight and purpose built vmm for malware analysis." Computer Security Applications Conference, 2009. ACSAC'09. Annual. IEEE, 2009.

PCT Notification of Transmittal of the International Search Report and the Written Opinion of the International Application No. PCT/US2014/071847, dated Mar. 26, 2015, 16 pages.

PCT Notification of Transmittal of the International Search Report and the Written Opinion of the International Searching Authority, or the Declaration, International Searching Authority, International Application No. PCT/US2014/071879, dated Apr. 28, 2015, 12 pages.

PCT Notification of Transmittal of the International Search Report and the Written Opinion of the International Searching Authority, or the Declaration, International Searching Authority, International Application No. PCT/US2014/071923, dated Mar. 26, 2015, 13 pages.

Steinberg, Udo, and Bernhard Kauer. "NOVA: a microhypervisor-based secure virtualization architecture." *Proceedings of the 5th European conference on Computer systems*. ACM, 2010, 14 Pages.

Stumpf, Frederic, et al. "An approach to a trustworthy system architecture using virtualization." Autonomic and trusted computing. Springer Berlin Heidelberg, 2007. 191-202.

Sun, et al., "SecureSwitch: BIOS-Assisted Isolation and Switch between Trusted and Untrusted Commodity OSes," Center for Secure Information Systems, George Mason University, Feb. 26, 2013, 15 pages.

Wojtczuk, Rafal. "Subverting the Xen hypervisor." *Black Hat USA* 2008 (2008), 9 Pages.

Yan, Lok Kwong, et al. "Transparent and Extensible Malware Analysis by Combining Hardware Virtualization and Software Emulation." Internet Society, 2010. Downloaded from https://www.internetsociety.org/sites/default/files/05_1.pdf.

\* cited by examiner

INJECTION OF CONTENT PROCESSING DELAY IN AN ENDPOINT

RELATED APPLICATION

The present application claims priority from commonly owned Provisional Patent Application No. 62/140,993, by Ismael et al., entitled INJECTION OF CONTENT PROCESSING DELAY IN AN ENDPOINT, filed on Mar. 31, 2015, the contents of which are incorporated herein by reference.

BACKGROUND

Technical Field

The present disclosure relates to malware detection systems and, more specifically, to injection of content processing delay at an endpoint of a network.

Background Information

Data communication in a network involves the exchange of data between two or is more entities interconnected by communication links and sub-networks (segments). The entities are typically software processes executing in operating systems of computers, such as end nodes and intermediate nodes. The intermediate nodes interconnect the communication links and segments to enable transmission of data between the end nodes. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broaden their attack to exploit vulnerabilities in processes or applications, such as web browsers. For example, malware content may be embedded within objects associated with a web page hosted by a malicious web site.

Various types of security enhanced nodes, such as security appliances, are often deployed at different segments of the networks. These security appliances often employ virtualization systems to provide the enhanced security needed to uncover the presence of malware embedded within ingress content propagating over the different segments. The enhanced security may include anti-virus scanning software that scans the ingress content for viruses and other forms of malware, as well as virtual machines that replay the content to monitor its behavior during execution to detect anomalies that may indicate the presence of malware. However, by the time malware is detected, damage (e.g., in the form of an infection) may have occurred to a node (e.g., end node) on the network to which the malware had propagated. Moreover, the malware may have moved laterally throughout the network to infect other nodes in the network. Thus, there is a need to prevent infection at a node and, further, to prevent lateral movement of the infection among other nodes of a network.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein provide a malware detection system (MDS) appliance configured to inject delay associated with delivery and/or processing of communication traffic directed to one or more endpoints in a network. The MDS appliance may be illustratively positioned within the network to intercept (i.e., capture) and analyze (e.g., replay and instrument) one or more network packets of the communication traffic to detect whether an object of the packet contains malware. However, such analysis, e.g., malware detection analysis, may require extensive processing at the appliance and, thus, consume a considerable amount of time. Accordingly, the MDS appliance may inject delay into the delivery and processing of the object on the endpoint until the malware detection analysis completes and the malware is validated.

DESCRIPTION

Figure 1:
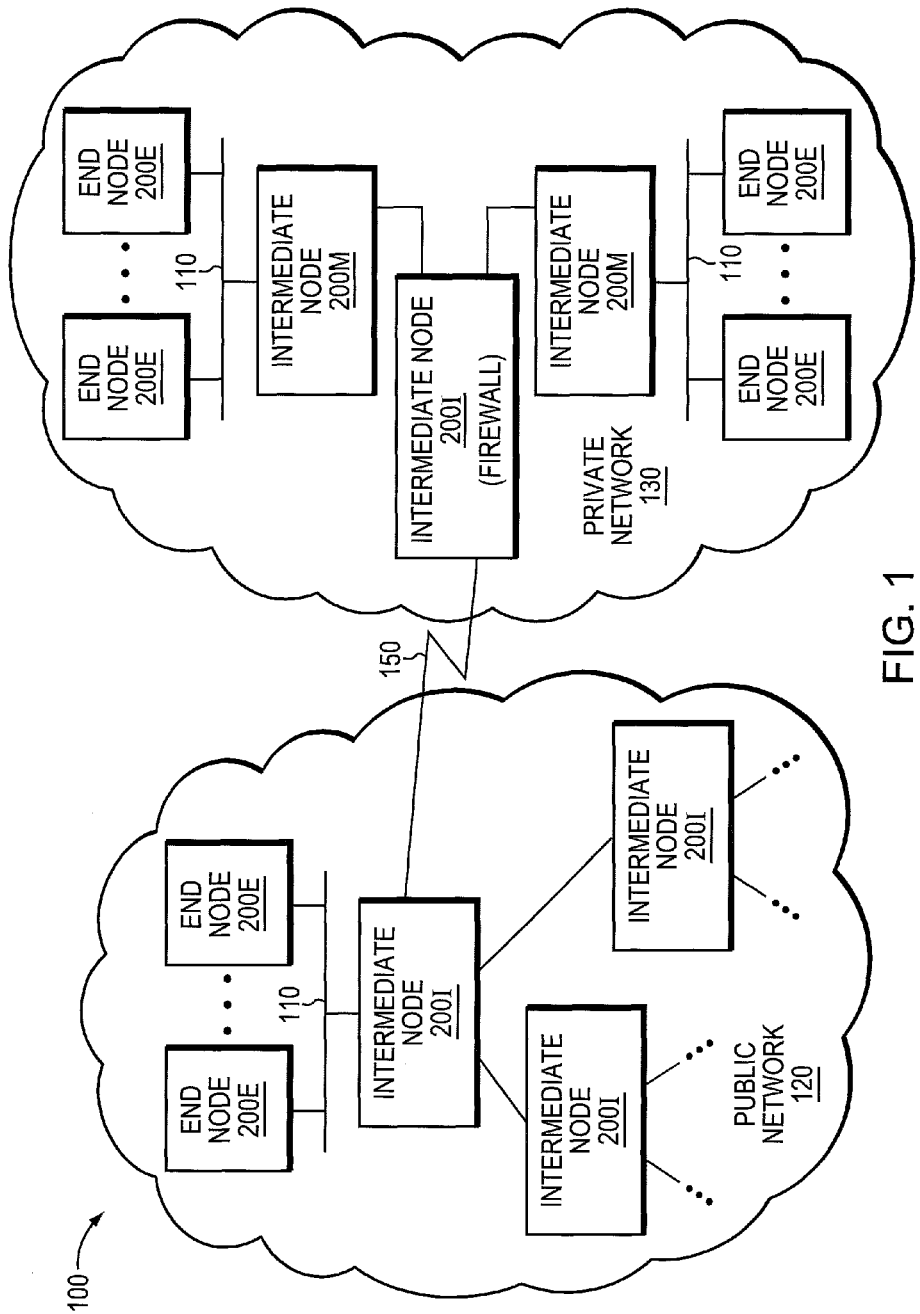
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate nodes $200_M$) described further herein. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., communication traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain communication (network) traffic in an attempt to protect the endpoints from unauthorized users. Unfortunately, such conventional attempts often fail to protect the endpoints, which may be compromised.

Figure 2:
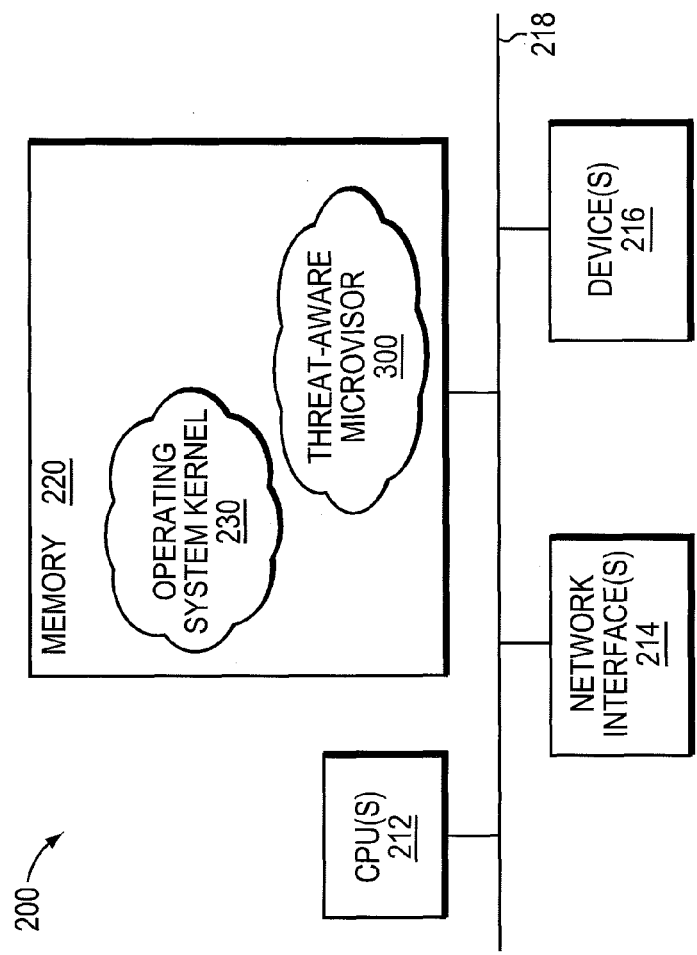
FIG. 2 is a block diagram of a node that may be advantageously used with one or more embodiments described herein.

FIG. 2 is a block diagram of a node 200, e.g., endpoint $200_E$ or MDS appliance $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to capture and analyze the incoming traffic (e.g., through static analysis) and potentially block that traffic which is classified as malware from reaching an internal destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface (s) 214 for storing software program code (including application programs) and data structures associated with the embodiments described herein. The CPU 212 may include processing elements or logic adapted to execute the software program code, such as threat-aware microvisor 300 as well as modules of malware detection architectures described herein, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the software program code and application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be implemented as operating system processes of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

Threat-Aware Microvisor

Figure 3:
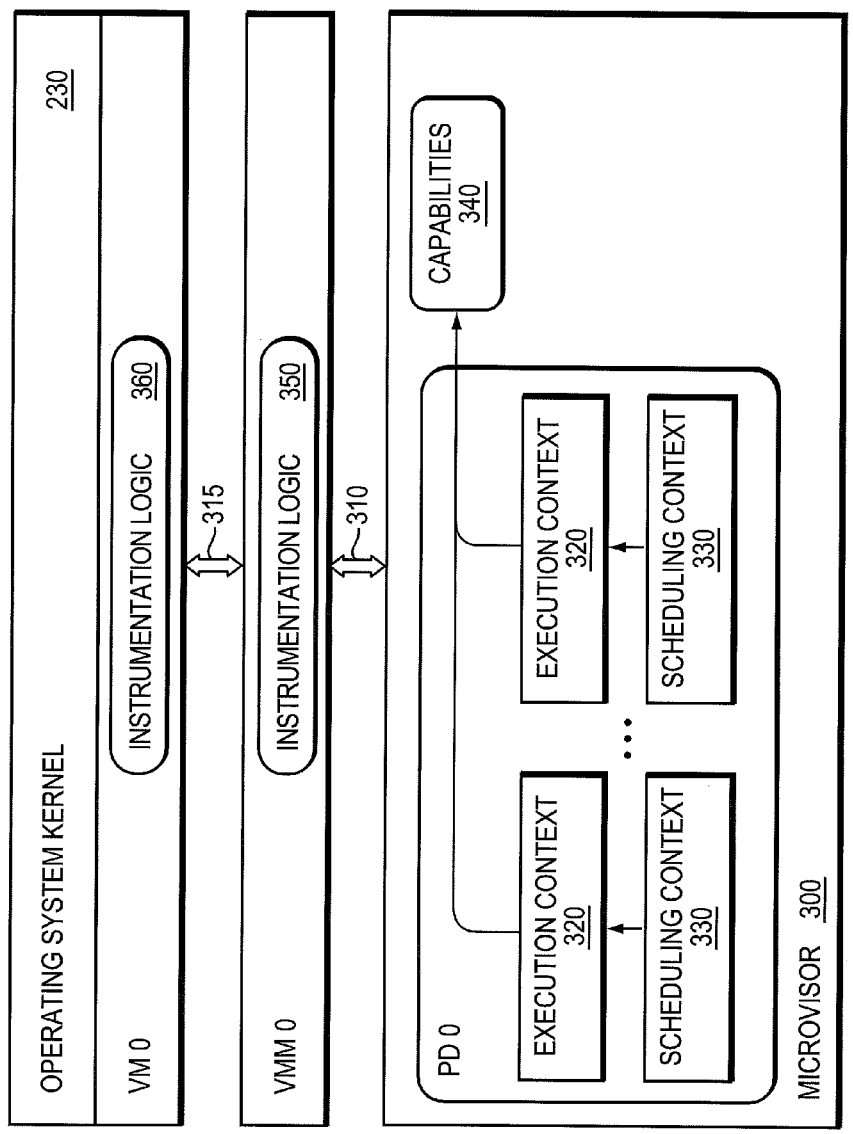
FIG. 3 is a block diagram of the threat-aware microvisor that may be advantageously used with one or more embodiments described herein.

FIG. 3 is a block diagram of the threat-aware microvisor 300 that may be advantageously used with one or more embodiments described herein. The threat-aware microvisor (hereinafter "microvisor") may be configured to facilitate run-time security analysis, including exploit and malware detection and threat intelligence, of operating system processes executing on the node 200. To that end, the microvisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The microvisor 300 may be configured to control access to one or more of the resources in response to a request by an operating system process to access the resource.

As a light-weight module, the microvisor 300 may provide a virtualization layer having less functionality than a typical hypervisor. Therefore, as used herein, the microvisor 300 is a module (component) that underlies the operating system kernel 230 and includes the functionality of a microkernel (e.g., protection domains, execution contexts, capabilities and scheduling), as well as a subset of the functionality of a hypervisor (e.g., hyper-calls to implement a virtual machine monitor). Accordingly, the microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360 directed to determination of malware in any suspicious operating system process (kernel or user mode). Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315 and 310.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. Illustratively, VMM 0 may contain computer executable instructions executed by the CPU 212 to perform operations that initialize and implement the instrumentation logic 350, as well as operations that spawn, configure, and control/implement VM 0 and its instrumentation logic 360.

In an embodiment, the microvisor 300 may be organized to include a protection domain illustratively bound to VM 0. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process) and, thus, is a representation of the process. Accordingly, the microvisor may provide a protection domain for the process and its run-time threads executing in the operating system. A main protection domain (PD 0) of the microvisor controls all of the kernel resources available to the operating system kernel 230 (and, hence, the user mode process) of VM 0 via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM (e.g., VM 0) bound to the protection domain.

Malware Detection Endpoint Architecture

Figure 4:
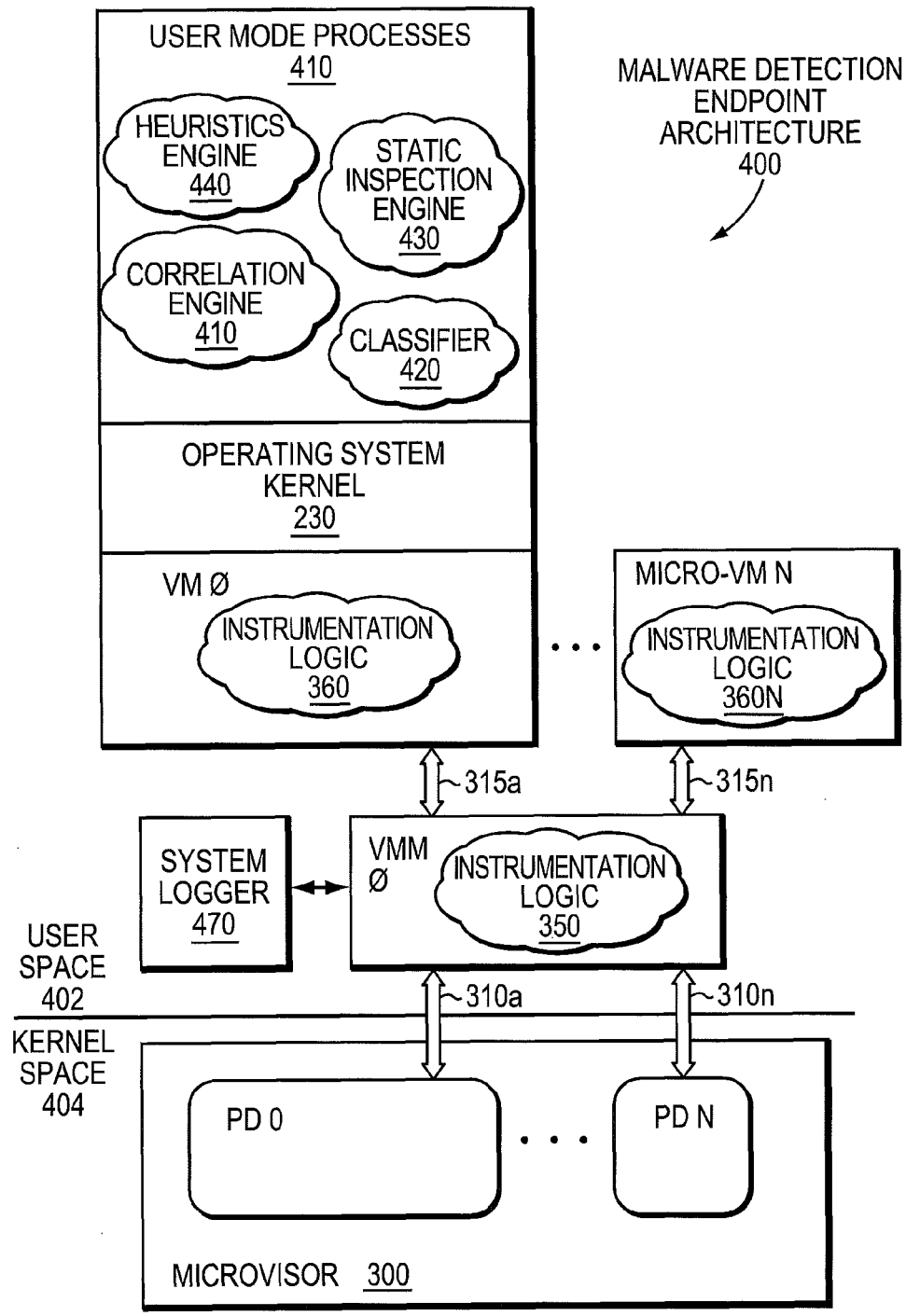
FIG. 4 is a block diagram of a malware detection endpoint architecture that may be advantageously used with one or more embodiments described herein.

In an embodiment, the threat-aware microvisor 300 may be deployed in a micro-virtualization architecture as a module of a virtualization system executing on the endpoint $200_E$ to provide exploit and malware detection within the network environment 100. FIG. 4 is a block diagram of a malware detection endpoint architecture 400 that may be advantageously used with one or more embodiments described herein. Illustratively, the architecture 400 may organize the memory 220 of the endpoint $200_E$ as a user space 402 and a kernel space 404. In an embodiment, the microvisor may underlie the operating system kernel 230 and execute in the kernel space 404 of the architecture 400 to control access to the kernel resources of the endpoint $200_E$ for any operating system process (kernel or user mode). Notably, the microvisor 300 executes at the highest privilege level of the hardware (CPU) to thereby virtualize access to the kernel resources of the endpoint in a light-weight manner that does not share those resources among user mode processes 410 when requesting the services of the operating system kernel 230. That is, there is one-to-one mapping between the resources and the operating system kernel, such that the resources are not shared.

A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the microvisor to detect anomalous behavior which may be used in determining malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device (such as a node) and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe any technique that causes a malicious attack, and encompasses both malicious code and exploits detectable in accordance with the disclosure herein.

As used herein, the term "micro" VM denotes a virtual machine serving as a container that is restricted to a process (as opposed to VM 0 which is spawned as a container for the entire operating system.) Such spawning of a micro-VM may result in creation of an instance of another module (i.e., micro-VM N) that is substantially similar to VM 0, but with different (e.g., additional) instrumentation logic 360N illustratively directed to determination of malware in the suspicious process by, e.g., monitoring its behavior. In an embodiment, the spawned micro-VM illustratively encapsulates an operating system process, such as a user mode process 410. In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and VM 0 by VMM 0 rather than virtually shared. Similar to VM 0, each micro-VM may be configured to communicate with the microvisor (via VMM 0) over privileged interfaces (e.g., 315n and 310n).

In an embodiment, the privileged interfaces 310 and 315 may be embodied as a set of defined hyper-calls, which are illustratively inter process communication (IPC) messages exposed (available) to VMM 0 and VM 0 (including any spawned micro-VMs). The hyper-calls are generally originated by VMM 0 and directed to the microvisor 300 over privileged interface 310, although VM0 and the micro-VMs may also originate one or more hyper-calls (IPC messages) directed to the microvisor over privileged interface 315. However, the hyper-calls originated by VM 0 and the micro-VMs may be more restricted than those originated by VMM 0.

In an embodiment, the microvisor 300 may be organized to include a plurality of protection domains (e.g., PD 0-N) illustratively bound to VM 0 and one or more micro-VMs, respectively. For example, the spawned micro-VM (e.g., micro-VM N) is illustratively associated with (bound to) a copy of PD 0 (e.g., PD N) which, in turn, may be bound to the process, wherein such binding may occur through memory context switching. In response to a decision to spawn the micro-VM N, VMM 0 may issue a hyper-call over interface 310 to the microvisor requesting creation of the protection domain PD N. Upon receiving the hyper-call, the microvisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities associated with the kernel resources. The capabilities for PD N may limit or restrict access to one or more of the kernel resources as instructed through one or more hyper-calls from, e.g., VMM 0 and/or micro-VM N over interface 310n to the microvisor. Accordingly, the microvisor 300 may contain computer executable instructions executed by the CPU 212 to perform operations that initialize, clone and configure the protection domains.

Advantageously, the microvisor 300 may be organized as separate protection domain containers for the operating system kernel 230 (PD 0) and one or more operating system processes (PD N) to facilitate further monitoring and/or understanding of behaviors of a process and its threads. Such organization of the microvisor also enforces separation between the protection domains to control the activity of the monitored process. Moreover, the microvisor 300 may enforce access to the kernel resources through the use of variously configured capabilities of the separate protection domains. Unlike previous virtualization systems, separation of the protection domains to control access to kernel resources at a process granularity enables detection of anomalous behavior of malware. That is, in addition to enforcing access to kernel resources, the microvisor enables analysis of the operation of a process within a spawned micro-VM to detect exploits or other malicious code threats that may constitute malware.

The user mode processes 410 and operating system kernel 230 may execute in the user space 402 of the endpoint architecture 400, although it will be understood to those skilled in the art that the user mode processes may execute in another address space defined by the operating system kernel. Illustratively, the operating system kernel 230 may execute under control of the microvisor at a privilege level (i.e., a logical privilege level) lower than a highest privilege level of the microvisor, but at a higher CPU privilege level than that of the user mode processes 410. In addition, VMM 0 and its spawned VMs (e.g., VM 0 and micro-VM N) may execute in user space 402 of the architecture 400. As a type 0 virtual machine monitor, VMM 0 (and its spawned VM 0 and micro-VMs) may execute at the highest (logical) privilege level of the microvisor. That is, VMM 0 (and its spawned VM 0 and micro-VMs) may operate under control of the microvisor at the highest microvisor privilege level, but may not directly operate at the highest CPU (hardware) privilege level.

Illustratively, the instrumentation logic of VMM 0 (and its spawned micro-VMs) may include monitoring logic configured to monitor and collect capability violations (e.g., generated by CPU 212) in response to one or more interception points to thereby infer malware. Inference of malware may also be realized through sequences of interception points wherein, for example, a system call followed by another system call having certain parameters may lead to an inference that the process sending the calls is malware. The interception point thus provides an opportunity for VMM 0 to perform "light-weight" (i.e., limited so as to maintain user experience at the endpoint with little performance degradation) analysis to evaluate a state of the process in order to detect a possible malware without requiring any policy enforcement. VMM 0 may then decide to spawn a micro-VM and configure the capabilities of its protection domain to enable deeper monitoring and analysis (e.g., through interception points and capability violations) in order to determine whether the process is malware. Notably, the analysis may also classify the process as a type of exploit (e.g., a stack overflow) or as malware and may even identify the same. As a result, the invocation of instrumentation and monitoring logic of VMM 0 and its spawned VMs in response to interception points originated by operating system processes and capability violations generated by the microvisor advantageously enhance the virtualization system described herein to provide an exploit and malware detection system configured for run-time security analysis of the operating system processes executing on the endpoint.

VMM 0 may also log the state of the monitored process within system logger 470. In an embodiment, the state of the process may be realized through the contents of the execution context 320 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 470 to the MDS $200_M$ of the network environment 100 by, e.g., forwarding the state as one or more IPC messages through VMM 0 (VM 0) and onto a network protocol stack (not shown) of the operating system kernel. The network protocol stack may then format the messages as one or more packets according to, e.g., a syslog protocol such as RFC 5434 available from IETF, for transmission over the network to the MDS appliance $200_M$.

Malware Detection

Exploit and malware detection on the endpoint may be performed in accordance with one or more processes embodied as software modules or engines containing computer executable instructions executed by the CPU to detect suspicious and/or malicious behaviors of an operating system process (including an application program) when, e.g., executing contents of an object, and to correlate and classify the detected behaviors as indicative of malware (i.e., a matter of probability). Notably, the endpoint may perform (implement) exploit and malware detection as background processing (i.e., minor use of endpoint resources) with user-directed data processing being implemented as its primary processing (e.g., majority use of endpoint resources), whereas the MDS appliance implements such exploit and malware detection as its primary processing (i.e., majority use of appliance resources). Detection of a suspicious and/or malicious object may be performed at the endpoint by static and dynamic analysis of the object. As used herein, an object may include a logical entity such as, for example, a web page, email, email attachment, file or universal resource locator (URL). Static analysis may perform light-weight (quick) examination of the object to determine whether it is suspicious, while dynamic analysis may instrument the behavior of the object as the operating system process executes (runs) via capability violations of, e.g., operating system events. A correlation engine 410 and a classifier 420 may thereafter cooperate to perform correlation and classification of the detected behaviors as malicious or not. That is, the correlation engine 410 and classifier 420 may cooperate to analyze and classify observed behaviors of the object (based on the events) as indicative of malware.

In an embodiment, the static analysis may perform light-weight examination of the object (including a network packet) to determine whether it is suspicious and/or malicious. To that end, the static analysis may include a static inspection engine 430 and a heuristics engine 440 executing as user mode processes of the operating system kernel 230. The static inspection engine 430 and heuristics engine 440 may employ statistical analysis techniques, including the use of vulnerability/exploit signatures and heuristics, to perform non-behavioral analysis in order to detect anomalous characteristics (i.e., suspiciousness and/or malware) without execution (i.e., monitoring run-time behavior) of the object. For example, the static inspection engine 430 may employ signatures (referred to as vulnerability or exploit "indicators") to match content (e.g., bit patterns) of the object with patterns of the indicators in order to gather information that may be indicative of suspiciousness and/or malware. The heuristics engine 440 may apply rules and/or policies to detect anomalous characteristics of the object in order to identify whether the object is suspect and deserving of further analysis or whether it is non-suspect (i.e., benign) and not in need of further analysis. The statistical analysis techniques may produce static analysis results that include, e.g., identification of communication protocol anomalies and/or suspect source addresses of known malicious servers.

The dynamic analysis may include exploit detection performed by, e.g., the microvisor 300 and micro-VM N to observe behaviors of the object. In an embodiment, exploit detection at the endpoint does not generally wait for results from the static analysis. The behaviors of the object may be observed by instrumenting the object (using, e.g., instrumentation logic 360N) as the operating system process runs at micro-VM N, wherein the observed run-time behaviors may be captured by the microvisor 300 and VMM 0, and provided to the correlation engine 410 as dynamic analysis results. Illustratively, monitors may be employed during the dynamic analysis to monitor the run-time behaviors of the object and capture any resulting activity. The monitors may be embodied as capability violations configured to trace particular operating system events. During instrumenting of the object at the micro-VM, the system events may trigger capability violations (e.g., exceptions or traps) generated by the microvisor 300 to enable monitoring of the object's behaviors during run-time.

The static analysis results and dynamic analysis results may be stored in memory 220 (e.g., in system logger 470) and provided to the correlation engine 410, which may provide correlation information to the classifier 420. Alternatively, the results or events may be provided or reported to the MDS appliance $200_M$ for correlation. The correlation engine 410 may be configured to operate on correlation rules that define, among other things, sequences of known malicious events (if-then statements with respect to, e.g., attempts by a process to change memory in a certain way that is known to be malicious). The events may collectively correlate to malicious behavior. As noted, a micro-VM may be spawned to instrument a suspect process (object) and cooperate with the microvisor 300 and VMM 0 to generate capability violations in response to interception points, which capability violations are provided as dynamic analysis result inputs to the correlation engine 410. The rules of the correlation engine 410 may then be correlated against those dynamic analysis results, as well as static analysis results, to generate correlation information pertaining to, e.g., a level of risk or a numerical score used to arrive at a decision of (deduce) maliciousness. The classifier 420 may be embodied as a classification engine executing as a user mode process of the operating system kernel 230 and configured to use the correlation information provided by correlation engine 410 to render a decision as to whether the object is malicious. Illustratively, the classifier 420 may be configured to classify the correlation information, including monitored behaviors (expected and unexpected/anomalous) and capability violations, of the object relative to those of known malware and benign content.

Malware Detection Appliance Architecture

In one or more embodiments, the MDS appliance $200_M$ may be embodied as an intermediate node configured to analyze communication traffic associated with one or more endpoints $200_E$ coupled to a network segment, such as segment 110, of a network, such as private network 130. The MDS appliance $200_M$ may be illustratively positioned (e.g., as an ingress/egress point) within the private network 130 or segment 110 to intercept (i.e., capture) the traffic. In one or more embodiments, the MDS appliance may manage each endpoint by, e.g., requesting replay and instrumentation of the traffic by the endpoint $200_E$. The intercepted traffic may also be replayed and instrumented (i.e., monitored) at the appliance. Thereafter, the instrumented traffic may be correlated at the MDS appliance $200_M$, and the appliance may be configured to communicate with and instruct the endpoint to, e.g., perform an action and receive notification of that action being performed.

Illustratively, the MDS appliance $200_M$ may include functionality directed to replaying of communication traffic and correlating instrumentation of that traffic with actions resulting from that traffic at the endpoint. For every network packet received, the appliance may run a heuristic to compute a flow, as appropriate, for the packet, and then create (spawn) a virtual machine (VM) to emulate the endpoint using an image of an operating system (guest operating system and one or more applications) configured to replicate a software processing environment of the endpoint, e.g., based on a payload (object) of the packet to be replayed and instrumented. As noted, an object may include a logical entity such as, for example, a web page, an email or email attachment, an executable (i.e., binary or script), a file (which may contain an executable), or URL. Information as to an appropriate processing environment may be provided by the packet itself, e.g., the packet header may identify the packet type, for example, a document such as a Portable Document Format (PDF) document and, thus, the processing environment may include a document reader, such as a PDF reader from Adobe Systems, Inc. Additionally, or in alternative embodiments, information may also be provided by the endpoint (such as the destination endpoint as specified in the packet) to the MDS appliance indicating a type of application software (process) executing within the operating system on the endpoint. The appliance may then launch a copy of the application along with appropriate instrumentation to process each object. For example, assume the MDS appliance $200_M$ replays HTTPS traffic received at the endpoint which executes, inter alia, an application (i.e., a web browser). The appliance may capture the communication (HTTPS) traffic destined to the endpoint, spawn the VM and launch a copy of the web browser along with instrumentation to monitor the traffic. As such, the MDS illustratively may 1) intercept and delay the communication traffic from arriving at the endpoint, and/or 2) instruct the endpoint to delay processing of the communication traffic while the VM executes the copy of the application (e.g., web browser).

Figure 5:
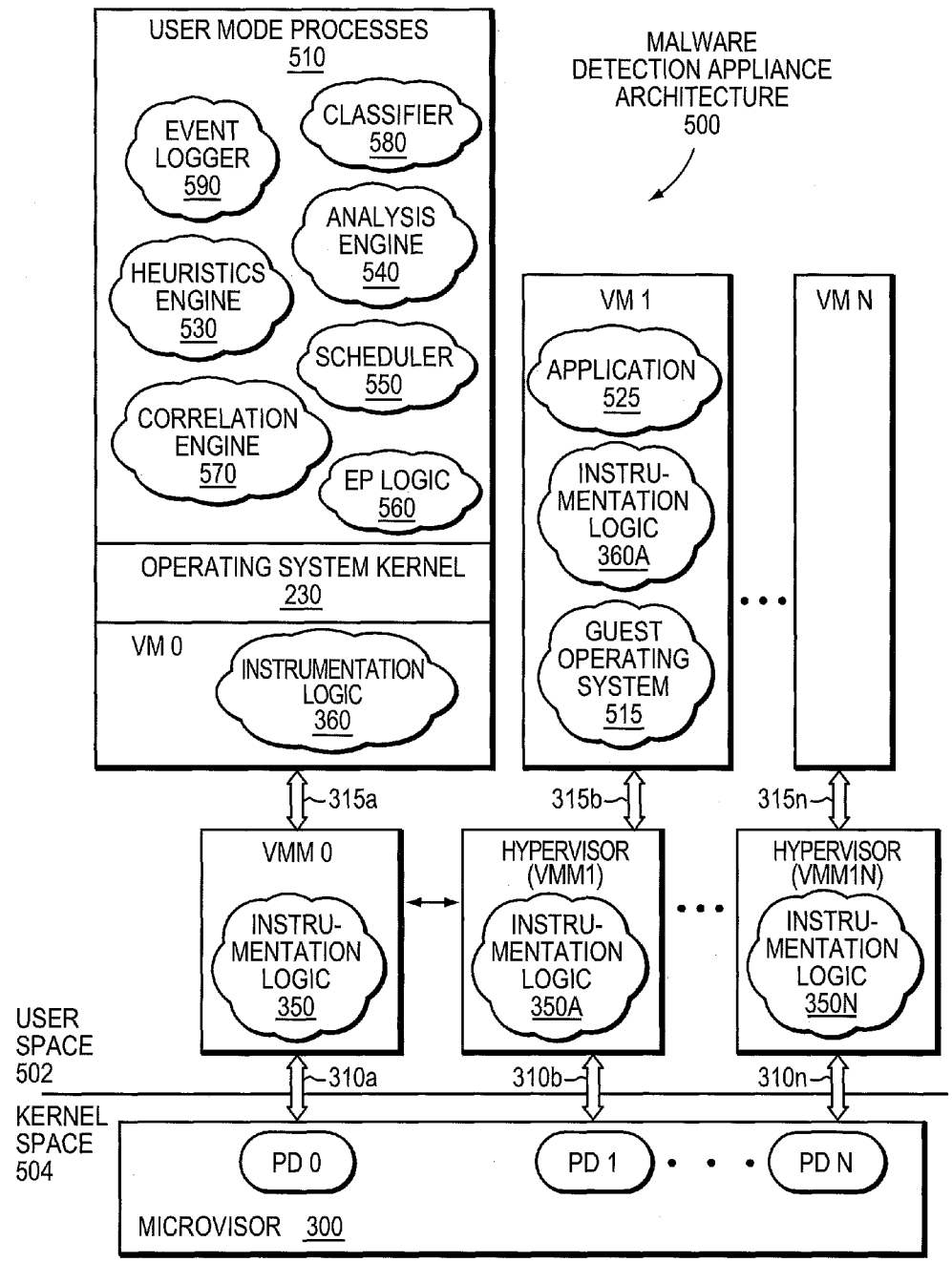
FIG. 5 is a block diagram of a malware detection appliance architecture that may be advantageously used with one or more embodiments described herein.

In an embodiment, the threat-aware microvisor 300 may be deployed in a virtualization architecture as a module of a virtualization system executing on the MDS appliance $200_M$ to provide exploit and malware detection within the network environment 100. FIG. 5 is a block diagram of a malware detection appliance architecture 500 that may be advantageously used with one or more embodiments described herein. Illustratively, the architecture 500 may organize the memory 220 of the MDS appliance $200_M$ as a user space 502 and a kernel space 504. The microvisor may underlie the operating system kernel 230 and execute at the highest privilege level of the CPU within the kernel space 504 of the architecture 500 to control access to the kernel resources of the appliance $200_M$ for any operating system process (kernel or user mode). User mode processes 510 and operating system kernel 230 may execute in the user space 502 of the appliance architecture 500. Illustratively, the operating system kernel 230 may execute under control of the microvisor at a privilege level (i.e., a logical privilege level) lower than a highest privilege level of the microvisor, but at a higher CPU privilege level than that of the user mode processes 510. In addition, VMM 0 and VM 0 may execute in user space 502 under control of the microvisor at the highest microvisor privilege level, but may not directly operate at the highest CPU (hardware) privilege level.

One or more hypervisors, e.g., type 1 VMM, may be disposed as one or more modules over the microvisor 300 and operate in user space 502 of the architecture 500 under control of the microvisor at the highest microvisor privilege level to provide additional layers of virtualization for the MDS appliance $200_M$. Illustratively, each hypervisor provides full virtualization of kernel (hardware) resources and supports execution of one or more entire operating system instances (i.e., guest operating system) inside one or more full virtual machines. In one or more embodiments, the full virtual machine (VM) may simulate a computer (machine) based on specifications of a hypothetical (abstract) computer or based on an architecture and functions of an actual (real) computer. To that end, a hypervisor (e.g., VMM 1) may instantiate a full VM (e.g., VM 1) as a module provisioned with a software profile that includes a guest operating system (e.g., guest operating system 515) and any associated application programs (e.g., application 525), as well as instrumentation logic (e.g., instrumentation logic 360A) directed to determination of malware in any suspicious object or application executing on the guest operating system. Illustratively, the hypervisor may instantiate the full VM from a pool of VMs configured to closely simulate various target operating environments (e.g., software profiles) in which the malware is to be analyzed. The software profile (e.g., guest operating system and/or application program) provisioned and configured in the VM may be different (e.g., in vendor, type and/or version) from the software profile provisioned and configured in other instantiated VMs (e.g., VM N).

The instantiated VM (e.g., VM 1) is illustratively associated with (bound to) a copy of PD 0 (e.g., PD 1), wherein such binding may occur through memory context switching. In response to a decision to instantiate (spawn) the VM 1, VMM 1 may issue a hyper-call over interface 310*b* to the microvisor requesting creation of the protection domain PD 1. Upon receiving the hyper-call, the microvisor 300 may copy (i.e., "clone") the data structures (e.g., execution contexts, scheduling contexts and capabilities) of PD 0 to create PD 1 for the VM 1, wherein PD 1 has essentially the same structure as PD 0 except for the capabilities associated with the kernel resources. The capabilities for PD 1 may limit or restrict access to one or more of the kernel resources as instructed through one or more hyper-calls from, e.g., VMM 1 and/or VM 1 over interface 310*b* to the microvisor.

Illustratively, each hypervisor (e.g., VMM 1-N) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and their instrumentation logic (e.g., 360A). In an embodiment, there is illustratively one hypervisor (e.g., VMM 1-N) for each VM (e.g., VMs 1-N), wherein each VM may be used to emulate an endpoint. The MDS appliance $200_M$ may not emulate every endpoint on, e.g., a segment of the network 130, but when a suspicious object (such as, e.g., a file of a network packet) is identified, the VMM 1 of the appliance may create (spawn) a full VM 1 to analyze that object. The virtualization layers of the MDS appliance $200_M$ may cooperate to implement an abstraction of virtual devices exposed as, e.g., virtual network interfaces to the VMs, as opposed to the real network interfaces exposed to the micro-VMs of the endpoint.

The user mode processes 510 executing on the MDS appliance $200_M$ may include a heuristic engine 530 that, in response to receiving communication traffic, is configured to run one or more heuristics to determine whether the traffic (e.g., an object of a packet) is suspicious. Illustratively, the heuristic engine may use pre-defined anomalous behaviors (monitored activity) of verified exploits and malware to, e.g., identify communication protocol anomalies and/or suspect source addresses of known malicious servers. For example, the heuristic engine may examine metadata or attributes of the object and/or a code image (e.g., a binary image of an executable) of the object to determine whether a portion of the object matches a predetermined pattern or signature associated with a known type of malware. The heuristic engine 530 may provide the packet of the suspicious traffic to one or more processes 510 embodied as analysis engine 540. In an embodiment, the analysis engine 540 may be configured to perform static analysis of the object of the packet to, e.g., identify software profile information associated with an operating system instance for execution in a full VM (virtualizing all kernel resources).

The analysis engine 540 may also be configured to analyze other content of the packet (e.g., destination address of a network header) to determine its destination (i.e., the endpoint). To that end, the analysis engine 540 may be configured to cooperate with a module, e.g., endpoint (EP) logic 560, to communicate with the endpoint $200_E$, e.g., to identify and/or acquire information (including the software profile) associated with execution of the malware on the endpoint. Illustratively, communication with the endpoint may be effected by, e.g., forwarding one or more IPC messages to a network protocol stack (not shown) of the operating system kernel 230. The network protocol stack may then format the messages as one or more packets for transmission over the network to the endpoint. The analysis engine 540 may then provide the software profile information to another process embodied as scheduler 550, which may coordinate with the hypervisor, e.g., VMM 1, to spawn a VM, e.g., VM 1, to replay the traffic.

When replaying the traffic, the analysis engine 540 may employ the EP logic 560 to invoke appropriate instrumentation logic 360A of VM 1 to enable communication with the endpoint to perform dynamic analysis and/or correlation of the suspicious object. In an embodiment, correlation (as described herein) may be performed by one or more user mode processes embodied as a correlation engine 570. The instrumentation logic 360A may be configured to monitor different types of objects, such as payloads of network (web) and email packets, although alternatively, there could be separate web-based and email-based MDS appliances, each of which may be deployed the same way and configured to perform that same work. The MDS appliance $200_M$ may include a module that communicates with a similar module on the endpoint to perform the requested instrumentation. For example in the case of email objects, the application may be an email reader that analyzes email traffic captured by the appliance (and endpoint).

During instrumentation (monitoring) in VM 1, the object may manifest behaviors that are captured by the microvisor and VMM 1. That is, the object may execute within the software profile of VM 1 and its monitored operation (behaviors) observed. The microvisor 300 and VMM 1 may record any resulting activity as, e.g., an event within a database of another user mode process embodied as an event logger 590. In addition, the activity of the object (including the event) may be provided to the correlation engine 570 and to yet another user mode process embodied as a classifier 580 for classification and/or validation of the object as, e.g., malware. Illustratively, correlation engine 570 may be configured to correlate observed behaviors (e.g., results of dynamic analysis) with known malware and/or benign objects (embodied as defined rules) and generate an output (e.g., a level of risk or a numerical score associated with an object) that is provided to the classifier. The classifier 580 may be configured to classify the observed behaviors (expected and unexpected/anomalous) and capability violations of the object relative to those of known malware and benign content to render a decision of malware, i.e., validate the monitored operation of the object as malicious activity, based on the risk level or score exceeding a probability threshold.

Operationally, the MDS appliance may intercept (i.e., receive) and store communication traffic flowing over the network that is destined to the endpoints. The appliance may analyze the traffic and communicate with the endpoints over the network using a messaging protocol that encapsulates an object of interest (e.g., a file of a network packet). Illustratively, the MDS appliance may deploy the network protocol stack, e.g., of the operating system kernel 230 configured to employ a protocol to communicate with the endpoints. For example, the EP logic 560 may notify an endpoint to replay the object using a network message having a MAC address (layer 2 connectivity) and/or IP address of the endpoint (layer 3 connectivity).

Injection of Content Processing Delay at Endpoint by MDS Appliance

The MDS appliance $200_M$ may be further configured to inject delay associated with delivery and/or processing of intercepted communication traffic directed to one or more endpoints in the network 130. The appliance may analyze (e.g., replay and instrument) one or more network packets of the communication traffic to detect whether an object of the packet contains malware. However, such analysis, e.g., malware detection analysis, may require extensive processing at the appliance and, thus, consume a considerable amount of time. Accordingly, the MDS appliance may inject delay into the delivery and/or processing of the object on the endpoint until the malware detection analysis completes and the malware is validated.

In an embodiment, the delay injected into the delivery and/or processing of the object (packet) may be effected through manipulation of a transport protocol, e.g., the transmission control protocol (TCP), used to establish a logical TCP "peer" connection for exchanging packets between source (e.g., a malicious web site) and destination (e.g., the endpoint) "peer" nodes. The TCP connection may be established by a TCP process (such as a user or kernel mode process) executing on each of the peer nodes ("peers") in accordance with a conventional "3-way handshake" arrangement involving the exchange of TCP packet or segment data structures. The TCP segment data structures ("TCP segments") may also be used to exchange data between the TCP processes of the peers. The TCP protocol, establishment of a TCP connection and exchange of TCP segments among TCP processes are described in *Computer Networks, 3$^{rd}$ Edition*, particularly at pgs. 521-542, which is hereby incorporated by reference.

Figure 6:
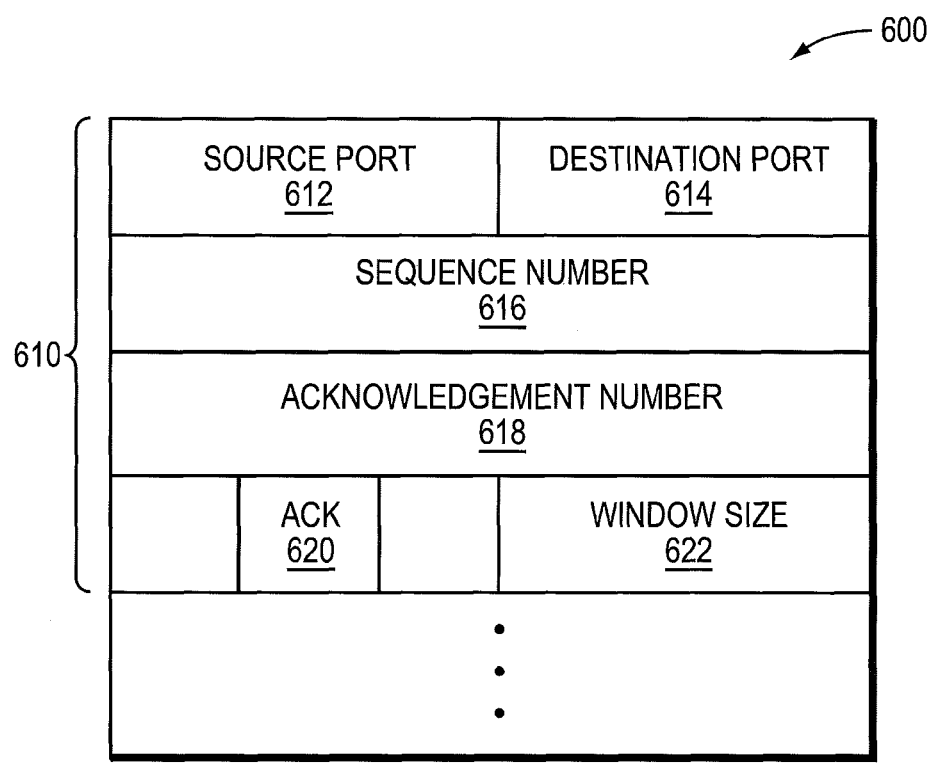
FIG. 6 is partial diagram of a format of a transmission control protocol segment that may be advantageously used with one or more embodiments described herein.

FIG. 6 is partial diagram of a format of a transmission control protocol segment that may be advantageously used with one or more embodiments described herein. The TCP segment includes a TCP header 610 having a source port field 612 containing a source port number and a destination port field 614 containing a destination port number. The source port number is used by a receiving peer node to reply to a TCP segment 600 issued by a sending peer node. A sequence number field 616 contains a sequence number of a first data byte in the segment and an acknowledgement number field 618 contains a number indicating the next sequence number that the receiving peer node expects to receive. The value contained in field 618 is only valid when an acknowledgement control bit (ACK 620) is asserted. Flow control in TCP is handled using a variable-size sliding window and a window size field 622 contains a value indicating the number of bytes that may be sent starting at the byte acknowledged.

Upon transmitting a TCP segment 600, the source may start a timer (e.g., a retransmission timer) and when the segment is received at the destination, the TCP process may return a TCP segment having an acknowledgement number equal to the next sequence number it expects to receive. If the retransmission timer expires before the acknowledgement is received, the source may retransmit the segment. TCP segments transmitted by the source may arrive out of order at the destination; however, acknowledgements may only be sent when data up to the byte acknowledged have been received. For example, if segments 0-2 and 4-10 have been received, the destination may acknowledge all data up to and including the last byte in segment 2. When the retransmission timer expires, the source may then retransmit segment 3. In addition, if the destination advertises a window size of 0 (e.g., because its receive buffer is full), the source may typically stop sending segments until the destination advertises a larger window size.

In an embodiment, the MDS appliance 200$_M$ may be positioned in-line with the endpoint to intercept packets of communication traffic destined to the endpoint. Assume that the heuristics engine 530 and the analysis engine 540 of the appliance determine that one or more of the intercepted packets are suspicious and, thus, require additional analysis. In response, the analysis engine 540 may cooperate with the TCP process of the operating system kernel 230 to inject delay of a specific duration into the delivery (and processing) of the packets at the endpoint. Illustratively, the duration of the injected delay may be specified based on the amount and content of the suspicious packets (traffic) or may be predetermined by a user (customer). The TCP process may then manipulate the TCP protocol by interrupting a flow of TCP segments to inject delay by, e.g., delaying delivery of a TCP segment 600 of an intercepted packet such that the destination (endpoint) treats the intercepted TCP segment 600 as an "out-of-order" segment. Accordingly, the source (web site) may retransmit the TCP segment after expiration of its retransmission timer, thereby detaining reception of the intercepted packet (i.e., delaying reconstruction of the intercepted packet at the endpoint) and thus injecting delay into the processing of the suspicious object at the endpoint 200$_E$. In addition, the analysis engine may cooperate with EP logic 560 of the MDS appliance to instruct the TCP process at the endpoint to advertise a small window size 622 (e.g., 0), which may temporarily suspend transmission (delivery) of subsequent segments (packets) to thereby inject further delay into the processing of the suspicious object at the endpoint. It should be noted that it is undesirable to impart a long delay that would interfere with the user experience at the endpoint; indeed, an exemplary delay should not exceed 7-10 seconds to ensure that the user experience is minimally impacted.

Malicious activity may be detected during the malware detection analysis of the object in the VM of the MDS appliance. The classifier 580 may then render a determination (validation) that the object contains malware, e.g., validate the malicious activity as malware, which may infect the endpoint and, thus, render the endpoint unsafe to operate. In response, the appliance may notify the endpoint of its determination that the object is malicious. The MDS appliance may also instruct the endpoint 200$_E$ to, e.g., perform an action. For example, the appliance may instruct the endpoint to terminate processing of the object (i.e., traffic), as well as transmission and/or reception of any further traffic. Because the microvisor 300 has control over all kernel resources of the endpoint and has a privilege level that cannot be impacted (i.e., breached), the MDS appliance 200$_M$ may implement a policy to shut down (freeze) the infected endpoint (e.g., upon reaching a state of infection) and prohibit any transmission and/or reception of traffic (packets) from that endpoint, thereby isolating the endpoint from the network. In addition, there may be actual remediation (i.e., a complete clean-up) of the malware (infection) at the endpoint, i.e., the customer (owner of the endpoint) may clean up the infection.

In an embodiment, delay may be also be injected at the endpoint through delayed execution of the suspicious object (process), e.g., when context switched at the microvisor level. Here, the injected delay at the endpoint 200$_E$ may be initiated and managed by analysis engine 540 of the MDS appliance 200$_M$ in response to, e.g., a full replay of the intercepted packet (traffic) which may consume a substantial amount of time. The duration of the injected delay may be specified by the appliance to be, e.g., an amount of time commensurate with a time needed for replay and analysis or in response to a signal indicating termination of execution delay, such as end of replay. Illustratively, the MDS appliance may instruct the endpoint via a first message to initiate injection of the delay having the specified duration followed by a second message instructing the endpoint to terminate or stop the delay (i.e., resume execution). At the endpoint, the injected delay may be effected by injecting code into the process containing the suspicious object (e.g., malware). The injected code may be an active loop routine having dummy code, such as a series of no operations (no-ops) or operations setting and unsetting a same state of the CPU (e.g., a register increment and decrement), configured to repeat or "loop" for a period of time sufficient to consume a scheduled time of execution for the process. For example, assume that VMM 0 attempts to perform correlation of monitored behavior of the malware during instrumentation of the process in a micro-VM (e.g., micro-VM N) of the endpoint. It may be desirable to delay execution of the process on the CPU 212 until the correlation of monitored behavior can be performed without breaking (disrupting) an instruction sequence or "logic" of the process being monitored. The active (dummy) loop code may be injected into the process prior to switching to the process' context (e.g., the execution context 320) for execution on the CPU, so as to effectively consume its scheduled time quantum (e.g., as indicated by the scheduling context 330) on the CPU 212. Upon expiration of the time quantum, the process context may be switched out of execution until a next scheduled time for the process to run. The injected code may also yield (give up) the scheduled time of execution for the process by initiating a software call (e.g., an API or system call) to the operating system to re-assign the scheduled time to another process to execute. In this way, the delay introduced through the active loop routine (or other expediencies) will not hold up processing of other software by the CPU during the delay period.

Figure 7:
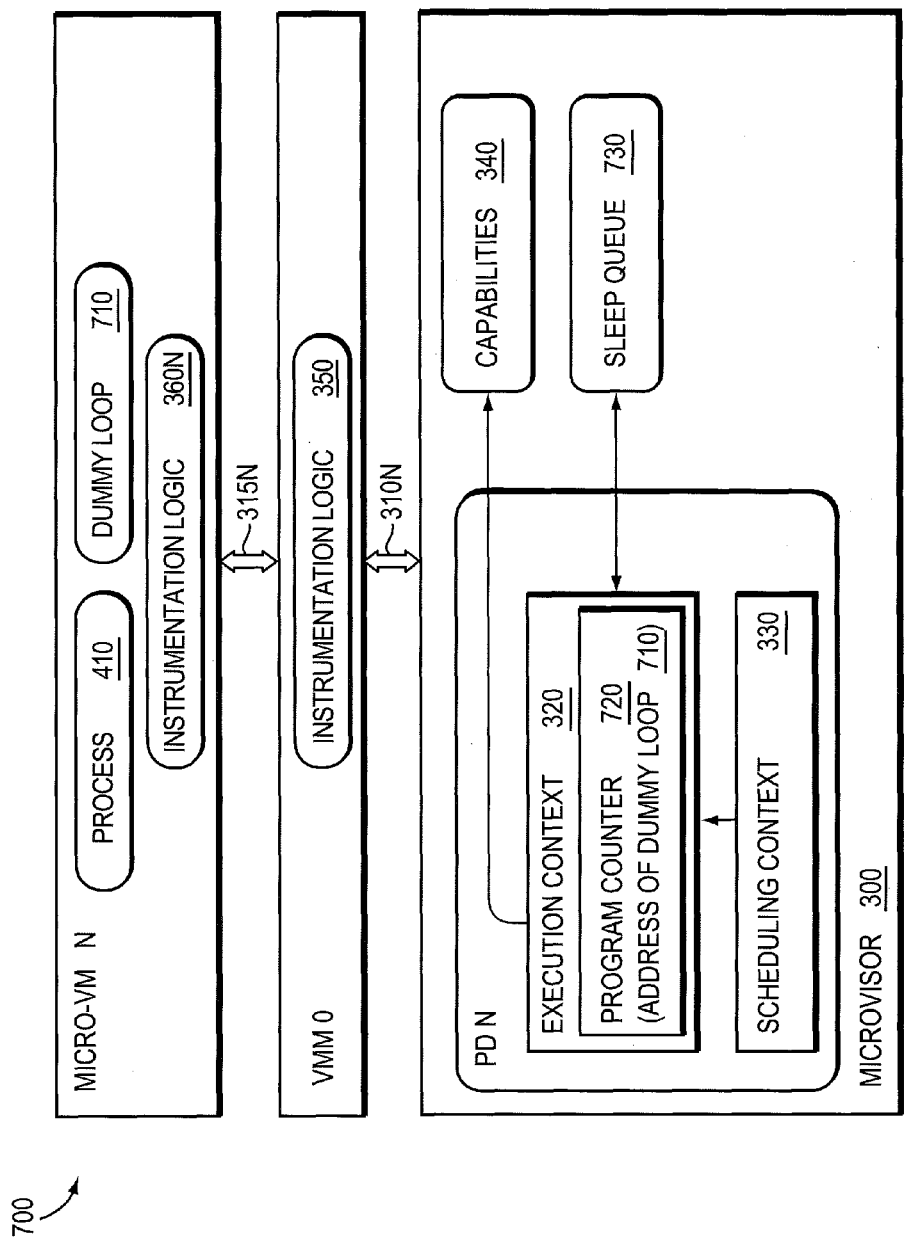
FIG. 7 is a block diagram illustrating a technique for injecting content processing delay that may be advantageously used with one or more embodiments described herein.

FIG. 7 is a block diagram illustrating a technique 700 for injecting content processing delay that may be advantageously used with one or more embodiments described herein. Illustratively, VMM 0 may register with the microvisor 300 (e.g., via a hyper-call) to receive an event (e.g., a notification such as a callback) when a thread of the suspicious process, e.g., user mode process 410, is scheduled to execute on the CPU. In response to the event, VMM 0 may cooperate with the microvisor 300 to change a pointer (address) of a program counter 720 (of execution context 320) referencing the thread (e.g., instruction) to an address of the dummy loop 710. Thus, instead of continuing execution at the address (i.e., instructions) of the thread, VMM 0 inserts the address of injected code 710, which initiates (or resumes) execution of the injected code on the CPU 212 so as to consume the scheduled time quantum. Notably memory pages having the injected code (i.e., dummy loop 710) are mapped into the address space of the process 410 so that execution of the dummy loop appears seamless (i.e., without page fault). The execution context 320 of the process may then be switched to a sleep queue 730, e.g., to allow another scheduled process/thread to execute on the CPU 212, thereby avoiding disruption to the process logic (i.e., monitored behavior). In this manner, the process may appear to execute, but makes no progress and, thus, is effectively delayed without disturbing the process logic.

In an embodiment, injection of code to slow down execution of the process 410 (application) may be employed in response to a determination, e.g., by the classifier 580 of the MDS appliance, that the process is malicious. Illustratively, an administrative function may also be executed to terminate ("kill") the process at the endpoint. That is, when a strong indication (e.g., exceeding a threshold of certainty) of the presence of an exploit/malware in the instrumented process is detected and/or confirmed at the MDS appliance, the appliance may instruct the endpoint to delay execution of the process. The instruction to delay process execution may also be effected by a command issued through a control console of an administrative interface (not shown). Illustratively, for the period of time between determination of the maliciousness of the process and an instruction to terminate that process, execution of the process may be delayed by injecting code (e.g., the dummy loop 710) during the scheduled execution of the process. In this manner, harm at the endpoint from the process may be prevented or reduced.

Time-delayed execution of, e.g., a process-initiated request at the microvisor to access one or more kernel resources of the endpoint allows the appliance more time to simulate the request and perform a more complete dynamic analysis of the object of the request. VMM 0 of the endpoint may also request delay of execution (e.g., suspension) of the process because the micro-VM may be executing program code that may take some time to complete. Yet unlike VMM 0 which spawns the micro-VM as a container for lightweight (i.e., limited so to maintain user experience) analysis of the process, the MDS appliance $200_M$ includes full virtualized hardware via the hypervisor (VMM 1) that spawns a full (i.e., virtualizing all kernel resources) VM used to analyze the behavior of the process. That is, the MDS appliance $200_M$ may be employed to provide more extensive instrumentation than can be provided by VMM 0 and its micro-VM at the endpoint.

As noted, the instrumentation of the micro-VM is lightweight in order to, inter alia, preserve (i.e., maintain) the user experience at the endpoint. Accordingly, the instrumentation performed by the micro-VM is limited such that there is no extensive CPU processing, i.e., efficient instrumentation that limits CPU processing to preserve the user experience. Instead, any extensive CPU processing is performed at the MDS appliance. The microvisor may impart some delay in process execution to allow more time for a deeper analysis of an object at the appliance. During such extensive processing associated with the analysis (at the MDS), the MDS appliance may identify activity that instrumentation of the micro-VM at the endpoint should observe or enforce in order to validate an occurrence of suspiciousness and/or maliciousness of suspected malware at the endpoint. For example, the appliance may instrument a VM to monitor operation (activity) of the object as it attempts to access one or more kernel resources. Such instrumentation may lead the MDS appliance to uncover (i.e., detect) potential malware that may manifest at the endpoint and, as such, the appliance may attempt to switch to more extensive instrumentation for further analysis and correlation with the endpoint. The endpoint may thereafter replay the process to spawn a micro-VM with appropriate instrumentation, thereby enabling the endpoint and appliance to validate the occurrence of suspiciousness. The micro-VM may decide whether the suspicious behavior (activity) is actual malware and, if so, record the observed behavior in a history database of the system logger 470.

Advantageously, maintaining a history database enables validation of states of the activity, e.g., of an object, that has been observed in the past. For example, assume that the microvisor and micro-VM allow malware (within an object) to execute and analyze the object to observe that it has resulted in certain state, e.g., creation of one or more files. The malware may thus be validated and observed using a generated signature of the malware. Upon obtaining sufficient information or completing the analysis, resources used to replay the object at the micro-VM may be reallocated because there may be other objects, such as files within packets, that need analysis. Details of the state and behavior of the files may be recorded to thereby maintain a robust identifier and/or signature for the malware (object), as well as obtain improved forensic information.

Accordingly, the MDS appliance may instruct the endpoint (i.e., the microvisor 300) to delay (slow down) execution of the process (object), e.g., in a micro-VM, to prevent manifestation of the exploit contained in the object. In an embodiment, each micro-VM of the endpoint may include instrumentation logic having an instrumentation package that includes one or more monitors, e.g., a type of instrumentation that monitors the behavior of code at the microvisor level. Illustratively, the instrumentation package may be part of VMM 0. In terms of implementation, different types of instrumentation can attach to the micro-VM. The micro-VM may also be able to dynamically switch between different types of instrumentation at the endpoint. Assume a particular type of instrumentation is executing that is relevant to a particular analysis. Subsequently, it may be determined that the instrumentation is not relevant or that some other instrumentation is desired, e.g., to slow down execution of the process. Here, the state of the analysis may continue but with a different type of instrumentation.

Figure 8:
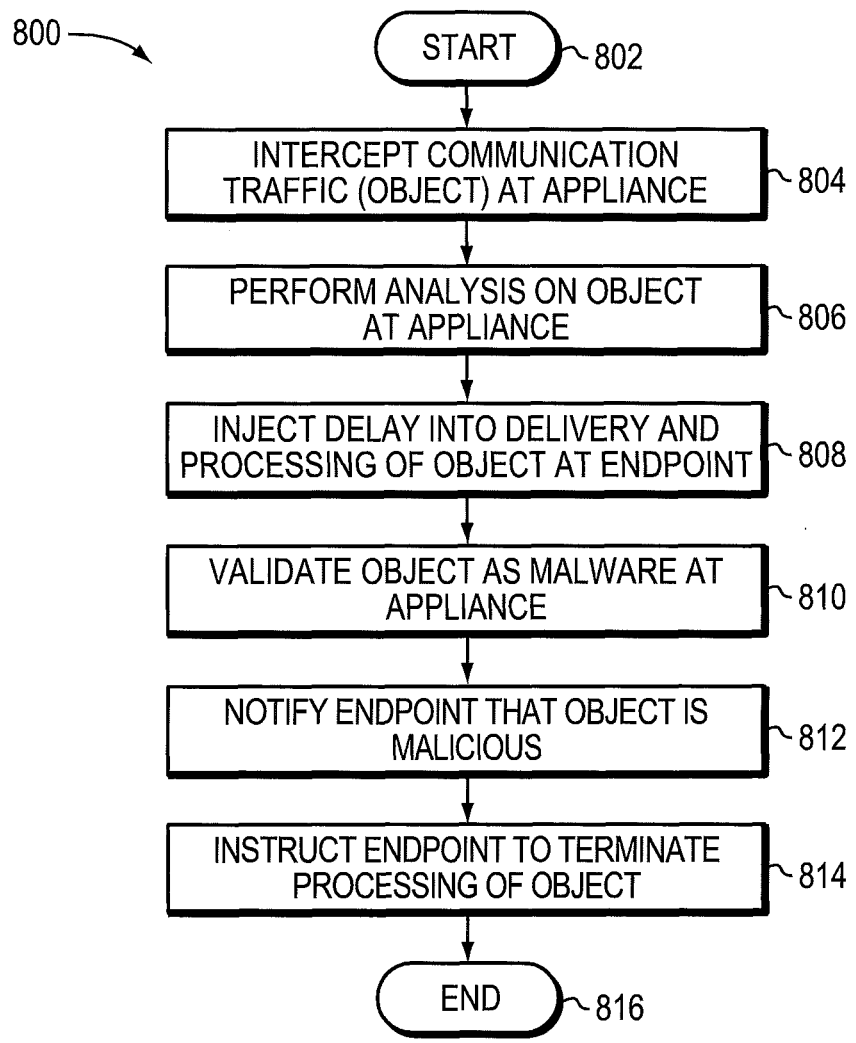
FIG. 8 is an example procedure for injecting delay associated with delivery and processing of communication traffic at one or more endpoints of the network environment.

FIG. 8 is an example procedure for injecting delay associated with delivery and processing of communication traffic at one or more endpoints of the network environment. The procedure 800 starts at step 802 and proceeds to step 804 where the MDS appliance may intercept communication traffic having an object of interest that is directed to an endpoint and, at step 806, perform exploit and malware detection analysis (e.g., instrumentation) on the object. At step 808, the appliance may inject delay into the delivery and processing of the object at the endpoint, e.g., to provide additional time for the appliance to analyze the object to determine whether it contains malware. At step 810, the classifier of the MDS appliance may validate the object as malware and, in step 812, the appliance may notify the endpoint of that the object is malicious. At step 814, the appliance may instruct the endpoint to terminate processing of the object and the procedure ends at step 816.

While there have been shown and described illustrative embodiments for injecting delay associated with delivery and processing of communication traffic directed to one or more endpoints in a network, it is to be understood that various other adaptations and modifications may be made within the spirit and scope of the embodiments herein. For example, embodiments have been shown and described herein with relation the MDS appliance injecting such delay to provide additional time for the appliance to analyze an object to determine whether it contains malware. However, the embodiments in their broader sense are not so limited, and may, in fact, provide a warning that may be displayed to an end user of the endpoint (destination) if a delay in the communication traffic transmission arises during analysis of the object at the MDS appliance. The warning may instruct the end user to be aware (and be patient) that the transmission (e.g., HTTP packet traffic) is being analyzed by the appliance.

In addition, although embodiments have been shown and described herein with relation to the microvisor and VMM 0 cooperating (at the endpoint) to inject content processing delay associated with the dummy loop, the embodiments may alternatively include a micro-kernel without protection domains (e.g., in lieu of the microvisor) operating at the highest CPU (hardware) privilege level and providing one or more interception points that pass control from the suspicious object executed in the VM N to the micro-kernel and/or hypervisor. In another alternative embodiment, the micro-kernel (without protection domains), VMM 0 and/or one or more hypervisors may be combined into a virtualization layer operating at the highest CPU privilege level that provide the one or more interception points. That is, the virtualization layer may underlie the operating system kernel (and/or guest operating system) such that the virtualization layer is configured to inject the specified delay at the endpoint associated with the dummy loop or manipulate the transport protocol to effect the delay as previously described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving an object at an appliance coupled to a network, the object directed to an endpoint on the network;
determining whether a malware detection analysis of the object requires extensive processing at the appliance;
in response to determining that the malware detection analysis requires extensive processing:
initiating delay of execution of the object at the endpoint; and
performing the malware detection analysis at the appliance, the malware detection analysis spawning a virtual machine to encapsulate a process including the object, the virtual machine instrumented to monitor operation of the process as the process attempts to access first and second kernel resources to detect whether the process includes malware.

2. The method of claim 1 wherein receiving the object comprises intercepting communication traffic at the appliance, the communication traffic including one or more packets containing the object.

3. The method of claim 2 wherein initiating delay of execution of the object comprises initiating injection of delay associated with one of delivery and processing of the object at the endpoint.

4. The method of claim 3 wherein initiating injection of delay associated with the one of delivery and processing of the object comprises injecting delay through manipulation of a transport protocol for transmitting the packet between a source of the object and the endpoint.

5. The method of claim 3 wherein initiating injection of delay associated with the one of delivery and processing of the object comprises injecting delay through delayed execution of the object when the process is context switched at a virtualization module of the endpoint.

6. The method of claim 2 further comprising:
validating the monitored operation of the process including the object as malicious activity; and
notifying the endpoint that the object is malicious.

7. The method of claim 6 further comprising, in response to validating the monitored operation of the process including the object as malicious activity, instructing the endpoint to terminate processing of the object.

8. The method of claim 6 further comprising, in response to validating the monitored operation of the process including the object as malicious activity, delaying execution of the object until the endpoint terminates processing of the object.

9. The method of claim 1 further comprising:
in response to determining that the malware detection analysis does not require extensive processing, instructing the endpoint to perform the malware detection analysis at the endpoint, wherein the malware detection analysis spawns a container to encapsulate the process including the object, and wherein the container is instrumented to monitor operation of the process as the process attempts to access the first and second kernel resources to detect whether the process includes the malware.

10. The method of claim 1 wherein initiating delay of execution of the object at the endpoint includes initiating execution of dummy code.

11. The method of claim 1 wherein delay of execution of the object at the endpoint is less than approximately 10 seconds.

12. A system comprising:
a network interface connected to a network;
a memory coupled to the network interface and configured to store an object, an operating system and a virtual machine; and
a central processing unit (CPU) coupled to the memory and adapted to execute the operating system and virtual machine, wherein the operating system is configured to:
intercept the object directed to an endpoint on the network;
determine whether a malware detection analysis of the object requires extensive processing;
in response to determining that the malware detection analysis requires extensive processing:
initiate injection of delay associated with one of delivery and processing of the object at the endpoint; and
perform the malware detection analysis to spawn the virtual machine to encapsulate a process including the object, the virtual machine instrumented to monitor operation of the process as the process attempts to access first and second kernel resources to detect whether the process includes malware.

13. The system of claim 12 wherein the object is contained in a packet of communication traffic directed to the endpoint.

14. The system of claim 13 wherein the operating system is configured to initiate injection of delay by instructing the endpoint to manipulate a transport protocol for transmitting the packet between a source of the object and the endpoint.

15. The system of claim 13 wherein the operating system is configured to initiate injection of delay through initiation of delayed execution of the object when the process is context switched at a virtualization module of the endpoint.

16. The system of claim 13 wherein the operating system is further configured to:
validate the monitored operation of the process including the object as malicious activity; and
notify the endpoint that the object is malicious.

17. The system of claim 16 wherein the operating system is further configured to instruct the endpoint to terminate processing of the object.

18. The system of claim 16 wherein the operating system is further configured to instruct the endpoint to initiate delay of execution of the object until the endpoint terminates processing of the object.

19. The system of claim 12 wherein the operating system is further configured to, in response to determining that the malware detection analysis does not require extensive processing, instruct the endpoint to perform the malware detection analysis at the endpoint, wherein the malware detection analysis spawns a container to encapsulate the process including the object, and wherein the container is instrumented to monitor operation of the process as the process attempts to access the first and second kernel resources to detect whether the process includes the malware.

20. A method comprising:
receiving a first instruction to delay execution of a process at an endpoint, the first instruction received from an appliance in response to detection of an indication of malware present in the process when instrumented at the appliance;
injecting delay into the process by executing dummy code at the endpoint; and
delaying execution of the process through execution of the dummy code for a duration specified by the appliance.

21. The method of claim 20 wherein delaying execution of the process comprises delaying execution of the process for a period of time that consumes a scheduled time of execution for the process.

22. The method of claim 21 wherein delaying execution of the process further comprises yielding the scheduled time of execution for the process by initiating a software call to an operating system of the endpoint to re-assign the scheduled time to another process to execute.

23. A non-transitory computer readable medium including program instructions for execution on one or more processors, the program instructions when executed operable to:
receive an object at an appliance coupled to a network, the object directed to an endpoint on the network;
determine whether a malware detection analysis of the object requires extensive processing at the appliance;
in response to determining that the malware detection analysis requires extensive processing:
initiate delay of execution of the object at the endpoint by executing dummy code; and
perform the malware detection analysis at the appliance, the malware detection analysis spawning a virtual machine as a container to encapsulate a process including the object, the virtual machine instrumented to monitor operation of the process as the process attempts to access first and second kernel resources to detect whether the process includes malware.

24. The method of claim 20 further comprising:
  receiving a second instruction, the second instruction received from the appliance in response to terminating instrumentation of the process at the appliance; and
  resuming execution of the process at the endpoint.

25. The computer readable medium of claim 23, wherein memory pages including the object are mapped into an address space of the process.

\* \* \* \* \*